April 20, 1954 S. E. M. STANDAL 2,675,717
SAW TOOTH FORMING AND SHARPENING MACHINE
Filed Nov. 5, 1951 5 Sheets-Sheet 1

STANLEY E. M. STANDAL
INVENTOR.

BY
Glenn L. Fish
Attorney

STANLEY E.M. STANDAL
INVENTOR.

April 20, 1954 S. E. M. STANDAL 2,675,717
SAW TOOTH FORMING AND SHARPENING MACHINE
Filed Nov. 5, 1951 5 Sheets-Sheet 3

STANLEY E. M. STANDAL
INVENTOR.

BY *Glenn L. Fish*

*Attorney*

April 20, 1954
S. E. M. STANDAL
2,675,717
SAW TOOTH FORMING AND SHARPENING MACHINE
Filed Nov. 5, 1951
5 Sheets-Sheet 4
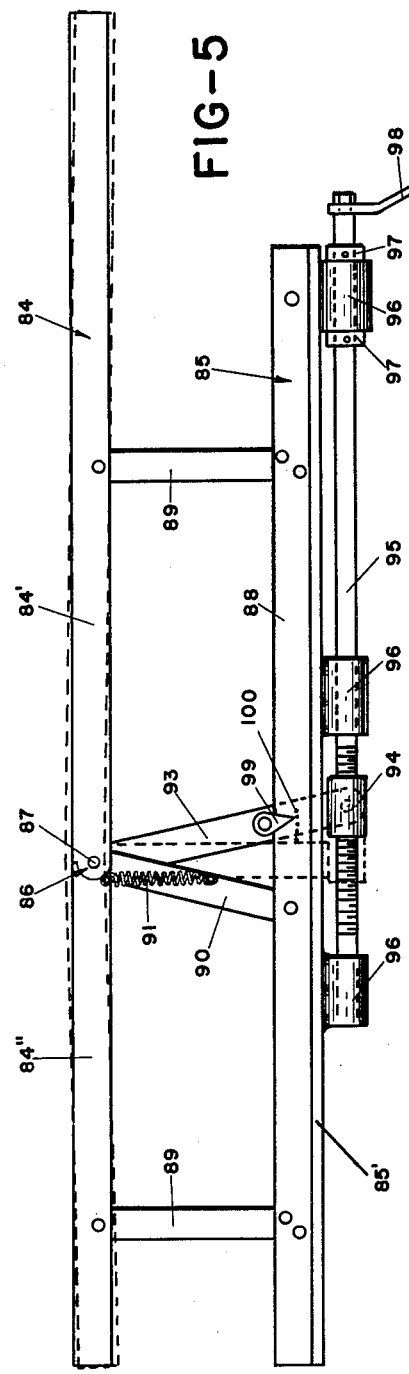
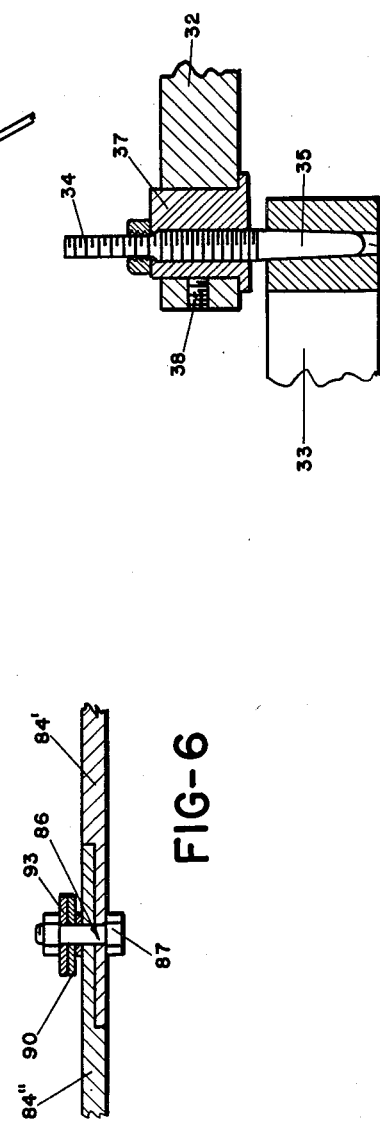
STANLEY E. M. STANDAL
INVENTOR.
BY
*Glenn L. Fish*
Attorney

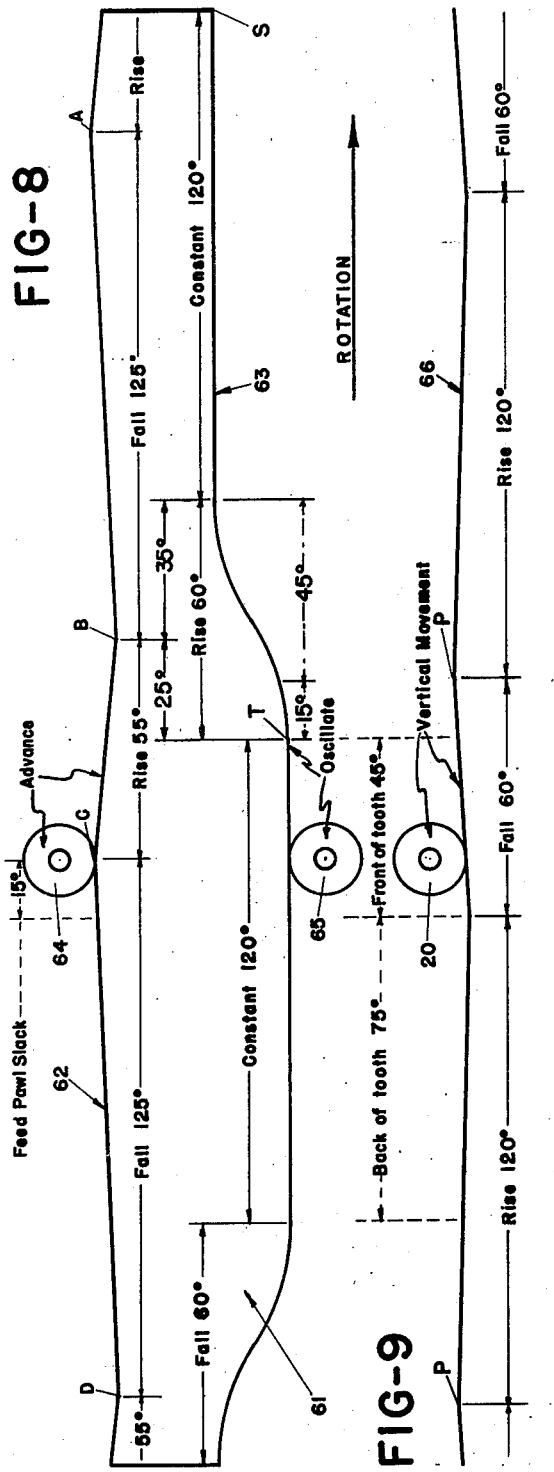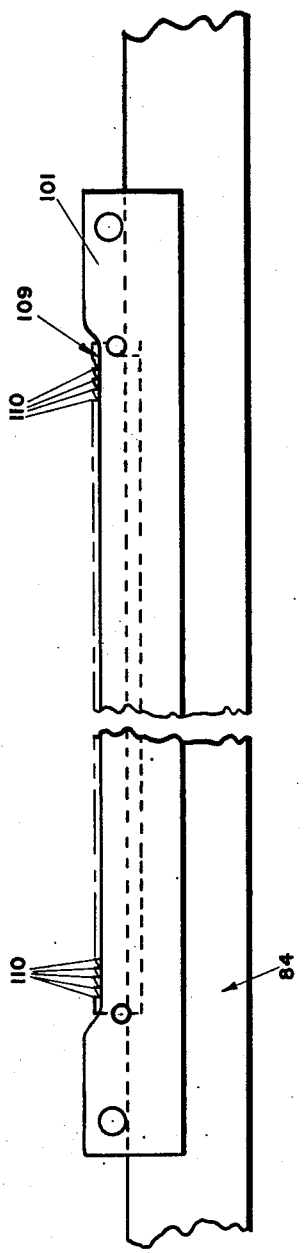

Patented Apr. 20, 1954

2,675,717

UNITED STATES PATENT OFFICE 2,675,717

SAW TOOTH FORMING AND SHARPENING MACHINE

Stanley E. M. Standal, Spokane, Wash.

Application November 5, 1951, Serial No. 254,857

3 Claims. (Cl. 76—41)

My present invention relates to machines for forming teeth on saws and for sharpening the same, and the objects of the invention are to provide a grinding machine which is adjustable to the extent that it can be adapted to grind various types of saws and various shapes of saw teeth; to accurately feed the saw so as to form and/or sharpen successive teeth of the saw; to provide means whereby the machine may be adjusted to form and/or maintain a desired crown to the cutting edge; to provide oscillating means for the abrading wheel for sharpening successive teeth along the saw's cutting edge; to improve the process of forming and/or sharpening saw teeth and generally to improve the operations of toothing and sharpening saws.

These and other objects will be apparent during the course of the following description.

In the accompanying drawings, forming a part of this specification and in which like numerals are employed to designate like parts, Figure 1 is a front view in elevation of my completed machine, showing a hand saw in operative position by dotted lines;

Figure 5 is an enlarged fragmentary front elevation of the saw carriage tracks and crowning adjustment mechanism;

Figure 6 is a fragmentary horizontal cross section of the upper track lap hinge;

Figure 7 is a vertical cross section of the eccentric journal block and pin assisting in adjustably and pivotally mounting the arbor on the vertically reciprocable carriage;

Figure 8 is a schematic diagram of the unitary feed and oscillator cams and their respective followers;

Figure 9 is a schematic diagram of the lift cam and its follower in one practical relative position to the cams of Figure 8; and Figure 10 is a fragmentary front elevation of a modified portion of the feed mechanism including a rack bar.

Figure 1:
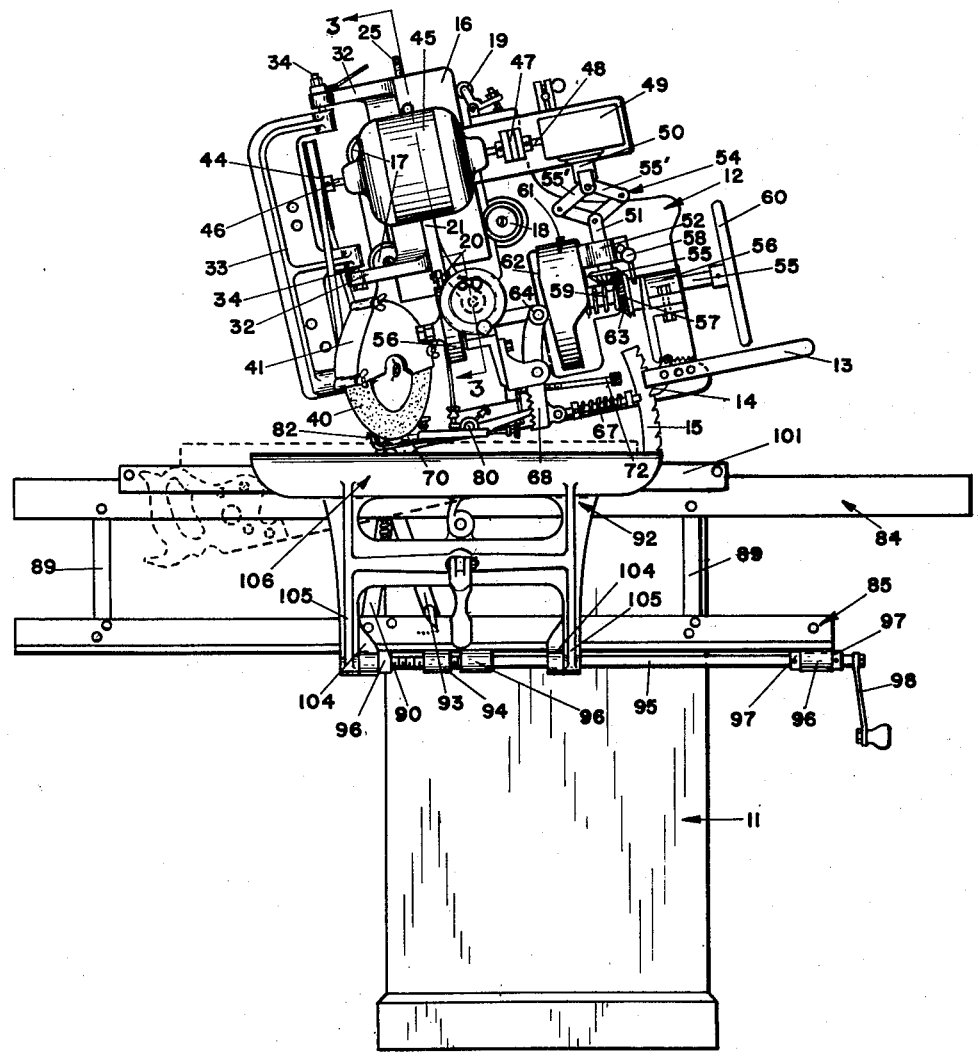

Referring to the drawings, I show pivotally supported on base 11, a head frame 12 adapted to be selectively tilted from level position by means of a tilt lever 13 secured to said frame and having a spring biased dog 14 cooperating with an arcuate toothed bar 15 rising from base 11.

A vertically reciprocable carriage 16 is provided with V-shaped ways (not shown) extending vertically the full length thereof on its side edges, and spaced upper and lower rollers 17 are journaled on the frame and mount said carriage, in cooperation with opposed roller 18, for vertical reciprocation. Roller 18 is provided with an eccentric journal (not shown) by means of which wear and clearances are compensated for to maintain the carriage 16 in accurate adjustment. A spring biased stabilizing roller 19 is pivotally secured on frame 16 and positioned to exert side pressure on the edge of said carriage 16.

A lift cam follower 20 is journaled in the end of a supporting arm 21 slidably mounted in a slot 22 which is open at its lower end. A removable backing plate 23 secures the supporting arm 21 for vertical movement relative to carriage 16. Backing plate 23 carries a projecting bearing 24 rotatably accommodating a vertically disposed elevating screw 25 having collars 26—26 for securing the screw against longitudinal movement, but permitting rotation thereof. The upper end of screw 25 is threadedly engaged in a threaded sleeve 27 carried by carriage 16.

Elevating screw 25 is rotated by means of a worm gear train 28 which unites the lower end of elevating screw 25 and the rear end of a forwardly extending elevating shaft 31 and rotation of shaft 31 will cause relative movement between the riser cam follower and carriage 16.

Carriage 16 is provided at one side with forwardly extending outwardly curved brackets 32—32 spaced vertically at the top and bottom edges thereof. Brackets 32 have enlarged end portions adapted to receive journal blocks having journal pins to pivotally support oscillatable arbor 33. The lower journal block and pin are concentric and the pin is identical to the pin 34 of the upper journal shown in Figure 7. The pins each have a tapered bearing surface 35 which is pivotally inserted in tapered sockets 36 of the arbor and the pins are threaded to permit adjustment axially thereof to eliminate "play" in the pivots. Upper journal block 37 has its pin 34 threaded therethrough eccentrically, and a set bolt 38 is provided in the bracket end portion to lock journal block 37 in selected positions. Rotation of the journal block 37 will effectively adjust the spaced pivots to properly align the arbor relative to a saw to be sharpened.

Journaled at its lower end, the arbor 33 is provided with an abrading wheel 40 suitably covered by a housing 41. A V-belt pulley 42 is mounted to rotate said abrading wheel and a V-belt 43 is trained thereabout and about motor pulley 44 carried by the shaft 46 of motor 45 mounted on carriage 16. Thus it can be seen that I have provided a motor driven abrading wheel 40 mounted to permit its being angled relative to a saw to be sharpened.

Abrading wheel 40 is journaled with its axis at right angles to the common axis of spaced upper and lower journal pins 34, and with the abrading wheel plane in parallel alignment with said common axis. Therefore when the abrading wheel is oscillated, by means of the oscillator arm 111, it will assume selected angles permitted by the oscillating mechanism hereinafter described and found best suited for cutting teeth in a saw blank and conforming to the front and rear faces of successive teeth of a saw.

On the end of motor shaft 46 opposed to pulley 44 I have provided a universal joint 47 which unites said motor shaft with shaft 48 of the gear reduction unit 49 having a driven shaft 50 projecting downwardly at right angles to shaft 48. Spaced from driven shaft 50 and in axial alignment therewith, is a stub shaft 51 supported in a bearing 52 carried by frame 12 and shaft 51 has a beveled gear 53 on the lower end thereof. An expansion joint 54 has pivotally united angular arms 55' whereby rotary motion is transmitted from driving shaft 50 to stub shaft 51 and which permit relative spreading movement of shafts 50 and 51 in axial alignment.

A cam shaft 55 is transversely positioned with respect to frame 12 and is rotatably mounted in spaced bearings 56—56 carried by the frame. A bevel gear 57 is splined to the shaft 55 to impart rotary motion thereto and be longitudinally movable thereon to be shifted into and out of meshing engagement with bevel gear 53 of stub shaft 51. A lever 58 is provided with a spreading cam to move gear 57 into meshing engagement with gear 53 and an expansion spring 59 disengages the gears when the lever is moved to releasing position. This unit is provided to function as a clutch for cam shaft 55.

On the outer end of cam shaft 55, I have provided a hand wheel 60 to permit manual rotation of the cam shaft when desired, as to synchronize the cam operations as will be later described.

Midway the length of the cam shaft I have provided a unitary cam 61 having a feed cam 62 on one edge face and an oscillator cam 63 on its opposed edge face. The feed cam follower 64 and oscillator cam follower are shifted in a direction parallel with the axis of the cam shaft 55. In reality as shown in Figure 1 the feed cam follower 64 and oscillator cam follower 65 are diametrically opposed to each other relative to the cam shaft 55 and cooperate with their respective cams. However, for convenience of description, the followers 64 and 65 are shown in Figure 8 as aligned on an axis parallel to the axis of shaft 55. Since each of said cams 62 and 63 are equally divided in multiples of 180 degrees the location of the followers is immaterial so long as their relative operational functions are synchronized.

A lift cam 66 is secured on the inner end of shaft 55 and its face is formed about the peripheral edge of the cam. The lift cam follower 20 journaled in supporting arm 21 cooperates therewith to reciprocate the carriage 16.

The operation and synchronous action of these three cams will now be described in detail with reference primarily to Figures 8 and 9 which are schematic diagrams showing the three cams in their relative orientation as they are secured to cam shaft 55. The direction of rotation of the cams is as indicated by the arrow and legend.

As here shown, the oscillator follower 65, the feed cam follower 64 and the lift cam follower 20 are located on a common axis parallel with shaft 55. However, in actual practice, the oscillator cam follower 65 and the feed cam follower 64 are located opposed to each other with relation to shaft 55 and in a common horizontal plane, while the lift cam follower 20 is positioned vertically above the shaft 55 and 90 degrees away from each cam 65 and 64 which are 180 degrees apart.

As here shown, the oscillator cam 63 has two constant periods of 120 degrees each on different levels as indicated by the legends and arrows. These two 120 degree levels are connected by tangent curves which constitute oscillation periods of 60 degrees each, as indicated by the legends and arrows. As here shown, the oscillator cam follower 65 has completed an oscillation period of 60 degrees and is into a 120 degree constant dwell period 45 degrees, wherein the front of one tooth is being ground and the back of the next successive tooth will be ground. Various relation of the three cams may be employed and the present illustration is given as a practical example.

As here shown, each half of the lift cam 66 has a 120 degree rise period and a 60 degree fall period. The oscillation period of the cam 63 is set so that the major portion of the oscillation will occur on the rising stroke and only a minor portion on the down stroke, as this affords a longer period for the grinding wheel to fully establish its plane of rotation. As here illustrated by the dot and dash line, 45 degrees of the previous oscillation was on the rise stroke and 15 degrees on the down stroke. This leaves 45 degrees down stroke, and the lift cam 20 should be of such size that this amount will be more than required for grinding the front face of a tooth of any saw intended to be ground on the machine, and it will of course be understood that the larger the teeth the more rise required. However, the lift cam 20 is always smaller than the feed cam 62 and not of the sizes here shown for the convenience of illustration.

Thus, 15 degrees of the down stroke of the lift cam is consumed during the oscillation period and only 45 degrees of the down stroke occurs during the 120 degree constant dwell period of the oscillator cam 63. This leaves 75 degrees of the constant dwell period to be consumed during the rise period of the lift cam 66 which has a 120 degree rise period as shown by the legend and arrow line, thus leaving a 45 degree rise period during the next oscillation and a 15 degree fall during that oscillation before the cam shaft 2 completes a half revolution or 180 degrees, which will bring the oscillator cam 63 to position where the beginning S of the shorter level is at the oscillation cam follower 65 instead of as here shown.

The feed cam 62 has two forward feed faces A—B and C—D of 125 degrees each and these are connected by the return faces B—C and D—A of 55 degrees each. This cam should be of sufficient size that the forward feed faces are somewhat in excess of the actual requirements so that it will not be necessary to utilize the peaks A and C nor the intersections B and D. Each of these forward feed faces should be accurately ground to an appropriate spiral curve proportionate to the rate of rise afforded by the lift cam 20, so as to produce an approximately straight line ascent of the grinding wheel up the back of each tooth. The return faces may be of any suitable curve. As here shown, the previous 60 degree rotation during the oscillation period, spread over a 35 degree portion of feed face A—B and a 25 degree portion of the return face B—C. This feed cam 62 is set in advance of the lift cam 66 so that the 60 degrees of rotation which complete the down stroke of the lift cam 66 will position the peak C of the feed cam 62, 15 degrees past its follower 64. Thus the feed follower 64 is moved before the rising portion of the lift cam 66 arrives at its follower 20. This 15 degrees of premature movement of the feed cam follower 64 is made the "slack" period in the feed action, and constitutes an idle movement which is quite necessary in the normal action of the feed; however, this "slack" may be utilized as actual feed, whenever it is desired to change the shape of the saw teeth. Thus the slack movement is in reality an available slack which may be utilized to whatever extent may be desired.

Confining the description to the normal operation, a 120 degree rotation from the beginning T of the higher level, will comprise 45 degrees of down stroke of the lift cam 66 which will carry the peak C of the feed cam, 15 degrees past its follower 64, during which period the front face of the saw tooth is ground without any feed action. The next 75 degrees rotation will constitute the rising action of the lift cam 66 occurring during the constant level of the oscillator cam 63, during which period the feed cam follower 64 moves forward to feed the saw the distance of one tooth. This 75 degree feed rotation constitutes the available feed, only a portion of which is utilized, depending upon the size of the saw teeth. In any event, this 75 degree rotation on the rising portion of the lift cam 66 extends over only a part of the aforesaid 125 degree advance feed portion C—D of the feed cam 62, thus leaving 35 degrees idle at the terminal end of C—D which together with the 15 degrees idle slack at the initial end of C—D constitutes the total 125 degrees of the feed portion C—D.

This described 120 degree constant dwell movement, leaves the remaining 60 degrees of the half revolution for the next oscillation period, 45 degrees of which will occur on the unconsumed rising stroke of the lift cam, and 15 degrees of which will occur on the down stroke of the next portion or fall of the lift cam; and during this 60 degree oscillation period, the feed follower 64 will idle past 35 degrees of the terminal end of the feed portion C—D and also idle past 25 degrees of the initial end of the return or rise portion D—A. These idle periods of the feed cam follower 62 may be varied by setting the threaded stop screw 67 shown in Fig. 4 so as to limit the feeding movement of the feed cam follower arm 68, and of course this correspondingly varies the return stroke of this feed cam follower. It should also be noted that the return stroke of the feed cam follower 64 is the positive action of the feed cam 62, and the feed stroke occurs on the release portions C—D, the actual feed being accomplished by the spring 72 shown in Figures 1 and 4.

Figure 4:
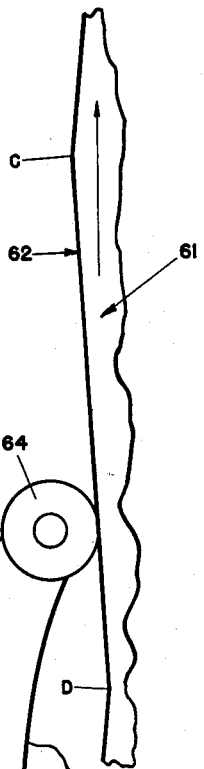
Figure 4 is an enlarged fragmentary front elevation showing one form of saw advancing feed mechanism and its related parts.
Figure 4:
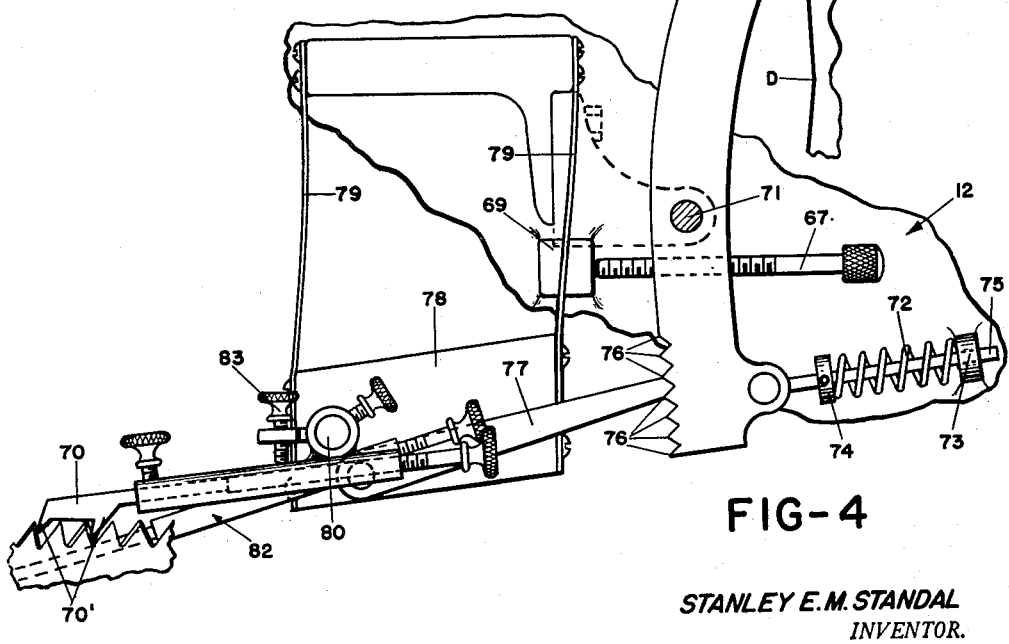

As shown in Fig. 4, the feed cam follower arm 68 is nearing the end of the feed stroke, and is prevented from going any further because the threaded stop screw 67 is in contact with the guide block 69. Thus it will be seen that the amount of forward feed can be reduced any required amount, by means of the stop screw 67; in which instance the movement of the feed cam follower arm 68 will be limited accordingly and the follower 64 will depart from the feed cam when the stop screw 67 contacts the block 69. This enables the one feed cam 62 to suffice for all of the various sizes of teeth conventional on hand saws commonly used by carpenters and cabinet makers. Moreover, it leaves the amount of feed under the immediate control of the operator so that he can instantly change from one size of teeth to another, merely by manipulating the stop screw 67, no different cams being required and no change in the setting of the cams being required.

Any selected portion of the faces A—B and C—D of the feed cam 62, will afford the same rate of feed as any other portion of these forward faces; hence, this feed cam can be set at any required position without altering the rate of feed, and without altering the shape of the saw teeth, provided that the stop screw 62 is set so as to utilize all of the available slack afforded by that particular setting of the stop screw 67 by observing the movement of the feed pawl 70 relative to the work, or else by observing the shape of the saw teeth produced. For convenience and speed, a feeler gauge may be employed for setting the stop screw 67.

In actual practice, the feed cam 62 is set in advance sufficient to afford an available slack of say .050 of an inch, and there is provided a set of feeler gauges. Each of these feeler gauges has a thickness equal to a standard tooth spacing, plus the .050 slack. That is to say, a .125 tooth gauge is .175 thick. To use such a gauge, the feed cam 3 is turned so that its peak C or A contacts the follower 64, the stop screw 67 is then turned until the gauge will just pass between the stop screw 67 and the block 69. The gauge is then removed and the machine is in readiness to grind a saw with .125 teeth, in which condition the feed cam follower arm 68 will have .050 movement before the feed pawl 70 moves the saw carriage; and this cam follower 64 will leave the cam when the amount of actual feed exceeds .125. In like manner a .250 tooth gauge is .300 thick, a .100 tooth gauge is .150 thick, etc. This .050 slack is given as a practical example, and of course, any other suitable amount of slack could be adopted as standard practice.

The shape of the saw teeth can be changed by departing from the set amount of slack. Exceeding the set amount of slack will result in delayed feeding and produce a deep throat similar to what is conventionally known as gumming. Using less than the set amount of slack will result in premature feeding and will produce a shallow throat resembling a modified skip tooth.

As best seen in Figure 4, feed cam follower arm 68 is pivoted at 71 on the frame 12 and is spring biased to feed the saw carriage by means of expansion spring 72 compressed between a boss 73 on frame 12 and a collar 74 secured to rod 75 pivotally secured to arm 68 and reciprocable through boss 73. It is thus plainly seen that the feeding or working stroke of arm 68 is effected by spring 72 under tension and moved as permitted by feed cam follower 64 bearing on feed cam 62 and limited by stop screw 67 contacting stop 69. Positive portions D—A and B—C of feed cam 62 return the arm 68 compressing spring 72.

At the lower end of arm 68, I have provided multiple notches 76 and a tooth shaping bar 77 is shaped with one end adapted to be removably engaged in a selected one of said notches 76 whereby the movement of the arm 68 causes the bar 77 to shift longitudinally. When bar 77 is moved upwardly in the notches, the speed of movement of bar 77 is less than when placed in a lower notch 76. Therefore, the operator may form teeth of various heights by selectively placing the bar 77 in notches 76. The slower the bar 77 moves, the higher the tooth will be formed since the feed is slower than the normal lift, and the faster the bar 77 moves, the shorter the tooth formed.

The forward end of bar 77 is pivotally secured to a floating block 78 which is resiliently supported by means of spaced resilient straps 79—79 which are secured to a boss on frame 12 at their upper ends and to block 78 at their lower ends. A forwardly extending horizontal mounting bar 80 is anchored at its inner end to the floating block 78 and its forward end is free to receive a selected feed pawl or combination of feed pawls.

As shown in Figure 1 and detailed in Figure 4, the machine is supplied with the set of pawls adapted for feeding the saw by means of the saw's teeth. The set of pawls consists of a main feed pawl 70 and a follower pawl 81. The feed pawl 70 having two depending teeth 70' spaced identically the distance between the points of successive saw teeth on one side of the saw; i. e., the distance across the points of three successive saw teeth. The pawls are adjustable as to length to permit proper adjustment of the feed mechanism. The follower pawl is provided with a single tooth 82 (Figure 1) which is held up out of communication with the saw teeth by means of an adjustable pawl support 83 which is supported upon feed pawl 70. Feed pawl 70 feeds the saw the full length thereof up to the end of the saw and then drops off the end and permits lowering of the follower pawl to advance the saw while the abrading wheel completes the last few teeth. As can be seen, feed pawl 70 is on the incoming side of the abrading wheel 40 and the follower pawl 82 is on the opposed or trailing side.

To support the saw and permit its intermittant movement during the grinding process, I have provided a saw carriage adapted to clamp saws in desired relation to the abrading wheel 40. Spaced upper and lower horizontally extending tracks 84 and 85 are carried by base 11. As best seen in Figures 5 and 6, upper track 84 is a flat bar and has a lap hinge joint 86 at a point directly beneath abrading wheel 40. The hinge is formed by cutting away an end portion one-half of the thickness the full width of each section 84' and 84" and fitting the remaining half of each end portion into the space formerly occupied by the cut away portions. A pin 87 is then passed through the adjoining portions to pivot the lap hinge 86. Lower track 85 is L-shaped in cross section and has its tongue 85' extending forwardly with the lip 88 vertical. Spacers 89—89 are secured to lip 88 as by rivets and pivotally secured to track sections 84' and 84" on opposed sides of lap hinge 86. An angled brace 90 unites the two tracks at the lap hinge 86 to provide rigidity to the upper track and also permit breaking of the hinge 86 upwardly. A stabilizing spring 91 maintains tension on the hinge and eliminates minute movements of the hinge during the passage of saw carriage 92 thereover.

An angled push bar 93 is connected to the pin 87 and is journaled at its lower end on an internally threaded sleeve 94 carried by threaded rod 95 rotatably carried by spaced bearings 96 secured to track 85 and said rod 95 is prevented from longitudinal movement by means of collars 97—97 secured thereon one at each end of a selected bearing 96. When crank handle 98 is rotated, the push bar 93 is shifted at its lower end, and lap hinge 86 is moved to dispose sections 842' and 84" at a desired angular relation to effect arcuate travel of carriage 92 to conform to the crown of a saw being sharpened. An indicator 99 and indicia 100 may be applied to push bar 93 and track 85 respectively to facilitate selection of the desired setting.

Figure 2:
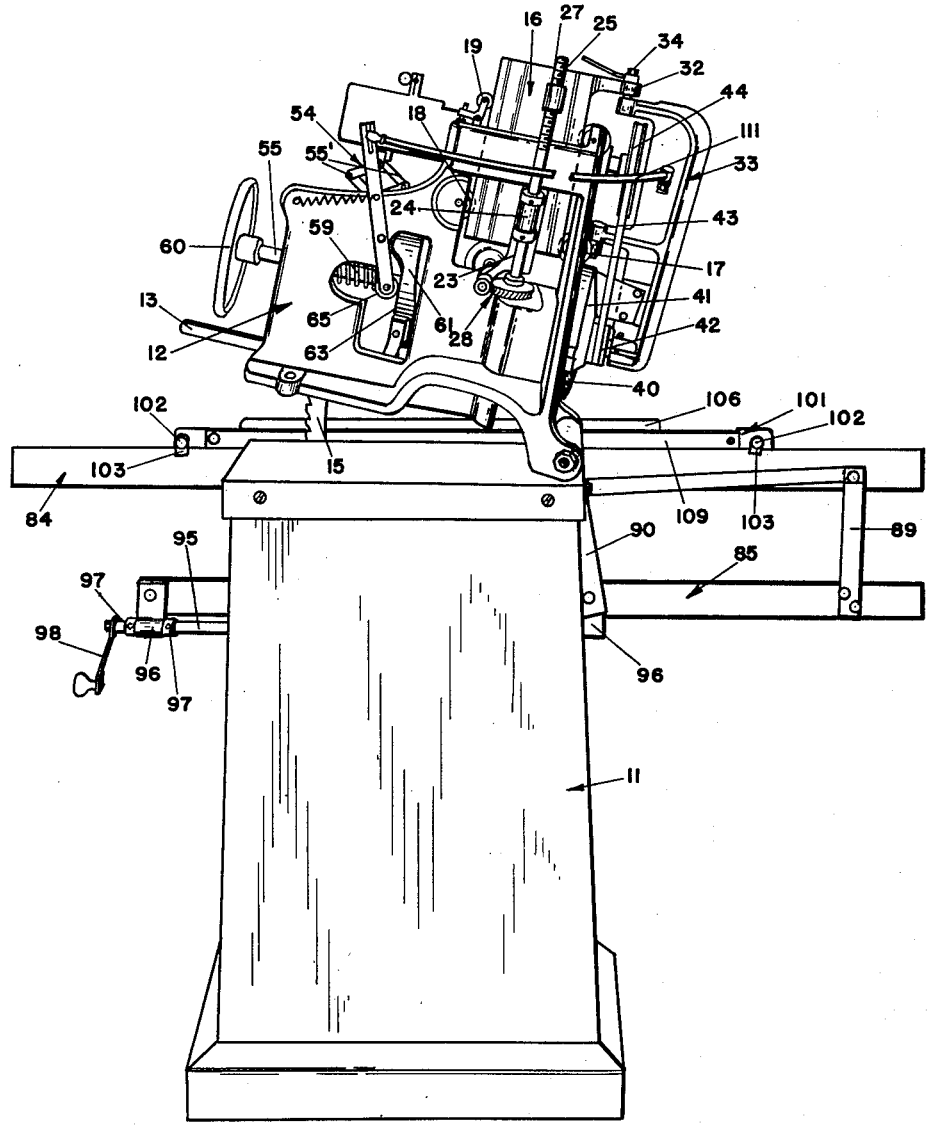
Figure 2 is a rear view in perspective and having the oscillator arm separated to position the pivotal arbor in alignment with the frame.
Figure 3:
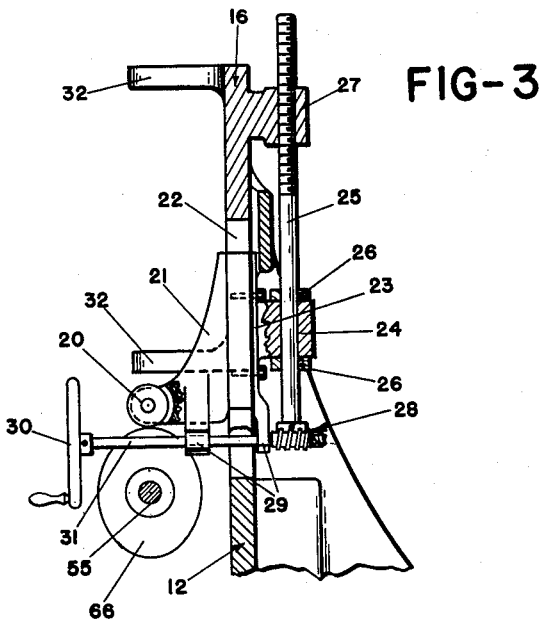
Figure 3 is an enlarged vertical cross section as at line 3—3 of Figure 1.

The carriage 92 comprises an elongated frame 101 (Figures 1, 2 and 10) having rollers 102 which roll on the top face of track 84 and have retainers 103 to prevent the carriage from being accidentally displaced from the track and also to permit longitudinal movement thereon.

Spaced legs 104—104 extend downwardly from the frame 101 and are pivotally united with spaced depending members 105—105 of saw clamp 106. The saw (indicated in dotted lines of Figure 1) is secured by means of a hand operated clamping screw 107 adapted to draw the clamp inwardly and thus securely hold the saw in the carriage frame.

In Figure 10, I have shown a modified form of saw carriage advancing mechanism which is adapted for use when cutting teeth in a saw blank or retoothing a saw and which comprises a rack bar 109 which is releasably supported in the frame 101 and the previously described pair of pawls 70 and 81 are removed and a single bit pawl substituted which is adapted to cooperate with the teeth of the rack bar to shift the saw carriage. Various rack bars, having more or less spacing between the teeth 110 are provided for various tooth spacings. The bar may be used in sharpening existing teeth so long as the teeth 110 correspond to the spacing of the existing saw teeth.

Having thus described my invention, what I claim and desire to secure by Letters Patent is:

1. In an apparatus of the character described, the combination of a supporting base; a frame mounted on said base and adapted to be tilted for selective angular adjustment; a vertically reciprocable carriage carried by said frame; an oscillatable arbor pivotally supported on said carriage and having an abrading wheel journaled thereon; a motor adapted to rotate said abrading wheel; a cam shaft rotatably carried by said frame and having a feed cam, an oscillator cam and a lift cam; means including a clutch between said motor and cam shaft whereby said cam shaft is rotated by said motor; means secured to said arbor and cooperating with said oscillator cam, whereby the arbor is oscillated to angularly shift said abrading wheel to conform to the faces of saw teeth to be ground; means on said carriage cooperating with said lift cam, whereby said carriage is vertically reciprocated; horizontal tracks carried by said base; a saw carriage movable on said tracks and adapted to clamp a saw in position to be ground by said abrading wheel; said feed cam having a return face; a follower actuated by said return face; resilient means compressible by said follower and biasing said follower toward said cam; and means between the feed cam follower and the saw carriage whereby the saw carriage is moved along the track by the compressible means after release of the follower from the return face.

2. In an apparatus of the character described, means for advancing a saw supported in a carriage comprising a driven cam having a return face, a fulcrumed follower biased for advancing movement opposed to the movement imparted thereto by said cam face, a reciprocable tooth shaping bar having a feed pawl to advance said saw, means positioning the push bar on the follower opposed to the cam for selectively spacing the bar from the fulcrum of the follower whereby the movement imparted to the bar from the biased movement of the follower is selectively variable, and an adjustable stop for limiting the feeding movement of said follower.

3. In an apparatus of the character described, means for advancing a saw supported in a carriage, comprising a rockable arm biased for advancing movement, means for rocking the arm in a direction opposed to said advancing movement, a reciprocable tooth shaping bar having a feed pawl to advance said saw, said tooth shaping bar having one end selectively movable along said rockable arm to adjusted positions toward and away from the rocking axis thereof, whereby the movement imported to the shaping bar by the rockable arm is selectively variable, and an adjustable stop for limiting the feeding movement of said follower.

References Cited in the file of this patent

UNITED STATES PATENTS

| Number | Name | Date |
|---|---|---|
| 574,855 | Schofield | Jan. 5, 1897 |
| 867,723 | Hedstrom | Oct. 8, 1907 |
| 1,480,172 | Majewicz | Jan. 8, 1924 |
| 1,779,969 | Gillmann | Oct. 28, 1930 |
| 1,846,331 | Hickey | Feb. 23, 1932 |
| 1,994,332 | Baze | Mar. 12, 1935 |
| 2,308,053 | Carlson | Jan. 12, 1943 |
| 2,333,298 | Daggett | Nov. 2, 1943 |
| 2,334,136 | Underwood | Nov. 9, 1943 |
| 2,429,300 | Wilbert | Oct. 21, 1947 |
| 2,479,978 | Smith | Aug. 23, 1949 |
| 2,519,735 | Boutin | Aug. 22, 1950 |
| 2,519,748 | Duquette | Aug. 22, 1950 |

FOREIGN PATENTS

| Number | Country | Date |
|---|---|---|
| 5,152 | Great Britain | Mar. 1, 1911 |
| 16,193 | Great Britain | July 7, 1914 |